United States Patent
Park et al.

(10) Patent No.: US 12,481,694 B2
(45) Date of Patent: *Nov. 25, 2025

(54) APPARATUS AND METHOD FOR OPTIMIZED SEARCH RESULTS USING DOCUMENT AND PASSAGE-LEVEL INTEGRATION

(71) Applicants: Hoseo University Academic Cooperation Foundation, Asan-si (KR); Livin AI Inc., Cheonan-si (KR)

(72) Inventors: Sung-Bum Park, Yongin-si (KR); Suehyun Chang, Seoul (KR)

(73) Assignees: HOSEO UNIVERSITY ACADEMIC COOPERATION FOUNDATION, Asan-si (KR); LIVIN AI INC., Cheonan-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/901,236

(22) Filed: Sep. 30, 2024

(65) Prior Publication Data

US 2025/0021594 A1    Jan. 16, 2025

Related U.S. Application Data

(63) Continuation of application No. 18/527,499, filed on Dec. 4, 2023, now abandoned, which is a continuation
(Continued)

(30) Foreign Application Priority Data

Jun. 2, 2021   (KR) .................. 10-2021-0071423
Jun. 2, 2021   (KR) .................. 10-2021-0071429

(51) Int. Cl.
G06F 16/383   (2019.01)
G06F 16/338   (2019.01)

(52) U.S. Cl.
CPC .......... *G06F 16/383* (2019.01); *G06F 16/338* (2019.01)

(58) Field of Classification Search
CPC ...... G06F 16/38; G06F 16/383; G06F 16/387; G06F 16/338
See application file for complete search history.

(56) References Cited

U.S. PATENT DOCUMENTS 10,255,273 B2 *   4/2019   Chakraborty ....... G06F 16/3344
11,163,780 B2 *  11/2021   Erera ................. G06F 16/24578
(Continued)

FOREIGN PATENT DOCUMENTS

KR   10-2197945    1/2021
WO   2017/201647   11/2017

OTHER PUBLICATIONS

Zhijing Wu et al., "Investigating Passage-level Relevance and Its Role in Document-level Relevance Judgment", SIGIR'19: Proceedings of the 42nd International ACM SIGIR Conference on Research and Development in Information Retrieval, pp. 605-614, Jul. 25, 2019.
(Continued)

*Primary Examiner* — Kris E Mackes
(74) *Attorney, Agent, or Firm* — LEX IP MEISTER, PLLC

(57) ABSTRACT

A method is presented for enhancing search results by segmenting documents into smaller passages and utilizing those passages as the search unit. This method integrates the passage rankings from two search models to produce a new document ranking and arranges the documents accordingly. The ranking of document is also rearranged based on the proportion of passages taken from the same document versus the total number of passages in that document. The final search ranking system combines document-level and passage-level search rankings to rank documents. This
(Continued)

method ensures that when conducting a passage search, the search results consider the general relevance of the entire document, which leads to better performance compared to searching only by document-level or passage-level searches.

8 Claims, 7 Drawing Sheets

Related U.S. Application Data of application No. PCT/KR2022/007811, filed on Jun. 2, 2022.

(56) References Cited

U.S. PATENT DOCUMENTS 11,226,972 B2 * 1/2022 Summers .......... G06F 16/24578
11,275,777 B2 * 3/2022 Ackermann .......... G06F 16/383

OTHER PUBLICATIONS

Gordon V. Cormack et al., "Reciprocal Rank Fusion outperforms Condorcet and Individual Rank Learning Methods", Proceedings of the 32nd International ACM SIGIR Conference on Research and Development in Information Retrieval, pp. 758-759, Jul. 23, 2009.

* cited by examiner

Passages that contains the query term in the first ranked document of the search result

APPARATUS AND METHOD FOR OPTIMIZED SEARCH RESULTS USING DOCUMENT AND PASSAGE-LEVEL INTEGRATION

BACKGROUND OF THE INVENTION

1. Field of the Invention

The present invention relates to a method for providing improved search results by integrating two or more information retrieval, more specifically, to a method for splitting each document to be searched into a plurality of smaller sized passages and storing them as a corpus, solving problems that arise v searches on these passages as a search unit, and providing improved search results by integrating information retrieval of documents and each of the passages contained in those documents, or by integrating two or more information retrieval of passages.

2. Description of the Related Art

Techniques for searching documents can be categorized into document-based search, where a given document is searched as a whole, and passage-based search, where each document is divided into multiple smaller passages. Since each method has its own advantages and disadvantages, it has been known that better results are provided when both methods are used together to integrate search results than either method alone. However, in the case of passage-based search method, it is necessary to divide each document into multiple passages and store them, which is a disadvantage, so the document-based search method has been mainly adopted.

Recently, as the performance of AI-based information retrieval models has been shown to provide improved search results compared to the performance of existing statistical search models, passage-based search methods have received renewed attention. The AI-based search models disclosed to date are limited in the size of documents they can process, so it is generally difficult to retrieve the entire document as search object. Therefore, when applying AI-based information retrieval models, a passage-based search method is mainly adopted. For example, in the case of BERT, a language model released by Google, the maximum number of tokens that can be processed is limited to 512, So researchers divide the document into passages containing around 100 to 300 tokens and process them as search objects.

However, when the document is divided into passages and searched, problems arise that are not present when the entire document is searched. For example, in FIG. 7, an example search result of a patent search system implemented by the present applicant is shown. As shown, when "cosmetics" is entered as a query, the document ranked first in the search results contains the word "cosmetics" twice and only two passages containing "cosmetics" out of a total number of 168 passages. In contrast, the second-ranked document has a total of 122 occurrences of the word "cosmetics" and 61 passages containing "cosmetics" out of a total of 124 passages. Furthermore, the document ranked first contains content that is entirely unrelated to the query "cosmetics". Therefore, if the entire document was the target of the search, the two documents would have ranked differently.

SUMMARY OF THE INVENTION

The present invention is intended to solve the above-described problem and provide a search method that retrieves highly relevant search results in view of the entire document, even when the search is performed by a passage-based method.

Additionally, the purpose of the present invention is to provide a search method that integrates document-level search results and passage-level search results to generate improved search results compared to the case where only one method is used.

According to one aspect of the present invention, there is provided a computer-implemented method for providing a user with search results corresponding to a query entered by the user from a passage corpus including a plurality of passages extracted from each document of a document corpus, the method comprising: (a) extracting and arranging, by a first retrieval model, from the passage corpus N passages in correspondence with the query; (b) re-ranking, by a second search model, the N passages based on the query; (c) generating an integrated ranking of the N passages by integrating the results in step (a) and the re-ranking in step (b) for the N passages; (d) arranging M documents containing the N passages with the integrated ranking for said N passages, wherein M is less than or equal to N; (e) arranging the M documents based on a relationship between the number of passages extracted from a particular document among the N passages and the total number of passages in the particular document; and (f) determining a final ranking for the M documents by integrating the results in step (d) and the results in step (e).

According to another aspect of the present invention, there is provided an apparatus for providing a user with search results corresponding to a query entered by the user from a passage corpus comprising a plurality of passages extracted from each document of a document corpus, comprising: at least one processor; and at least one memory for storing computer-executable instructions, wherein the computer-executable instructions stored in the at least one memory make the at least one processor to perform the following steps: (a) extracting and arranging, by a first retrieval model, from the passage corpus N passages in correspondence with the query; (b) re-ranking, by a second search model, the N passages based on the query; (c) generating an integrated ranking of the N passages by integrating the results in step (a) and the re-ranking in step (b) for the N passages; (d) arranging M documents containing the N passages with the integrated ranking for said N passages, wherein M is less than or equal to N; (e) arranging the M documents based on a relationship between the number of passages extracted from a particular document among the N passages and the total number of passages in the particular document; and (f) determining a final ranking for the M documents by integrating the results in step (d) and the results in step (e).

According to another aspect of the present invention, there is provided a computer-implemented method for providing a user with search results corresponding to a query entered by the user based on a document corpus including a plurality of documents to be searched and a passage corpus including a plurality of passages extracted from each document of the document corpus, the method comprising: (a) extracting and arranging, by a document-level search model, D documents from the document corpus corresponding to the query; (b) extracting and arranging, by a passage-level search model, N passages corresponding to the query from the passage corpus; (c) arranging M documents containing the N passages in a rank corresponding to the rank in which the N passages are arranged, wherein M is less than or equal to N; (d) arranging the M documents based on a relationship between the number of passages extracted from a single document among said N passages and the total number of passages in the single document; and (e) determining a final ranking of documents by integrating the results of arranging for the D documents in step (a) and the results of the arranging for the M documents in step (d).

According to another aspect of the present invention, there is provided an apparatus for providing a user with search results corresponding to a query entered by the user from a passage corpus comprising a plurality of passages extracted from each document of a document corpus, comprising: at least one processor; and at least one memory for storing computer-executable instructions, wherein the computer-executable instructions stored in the at least one memory make the at least one processor to perform the following steps: (a) extracting and arranging, by a document-level search model, D documents corresponding to the query from the document corpus; (b) extracting and arranging, by a passage-level search model, N passages corresponding to the query from the passage corpus; (c) arranging M documents containing the N passages in a rank corresponding to the rank in which the N passages are arranged, wherein M is less than or equal to N; (d) arranging the M documents based on a relationship between the number of passages extracted from a single document among said N passages and the total number of passages in the single document; and (e) determining a final ranking of documents by integrating the results of arranging for the D documents in step (a) and the results of the arranging for the M documents in step (d).

According to the present invention, improved search results can be provided even when the document to be searched is divided into a plurality of passages.

In addition, according to the present invention, a search method is provided that integrates document-level search results and passage-level search results to generate improved search results compared to either method alone.

DETAILED DESCRIPTION OF THE INVENTION

Figure 1:
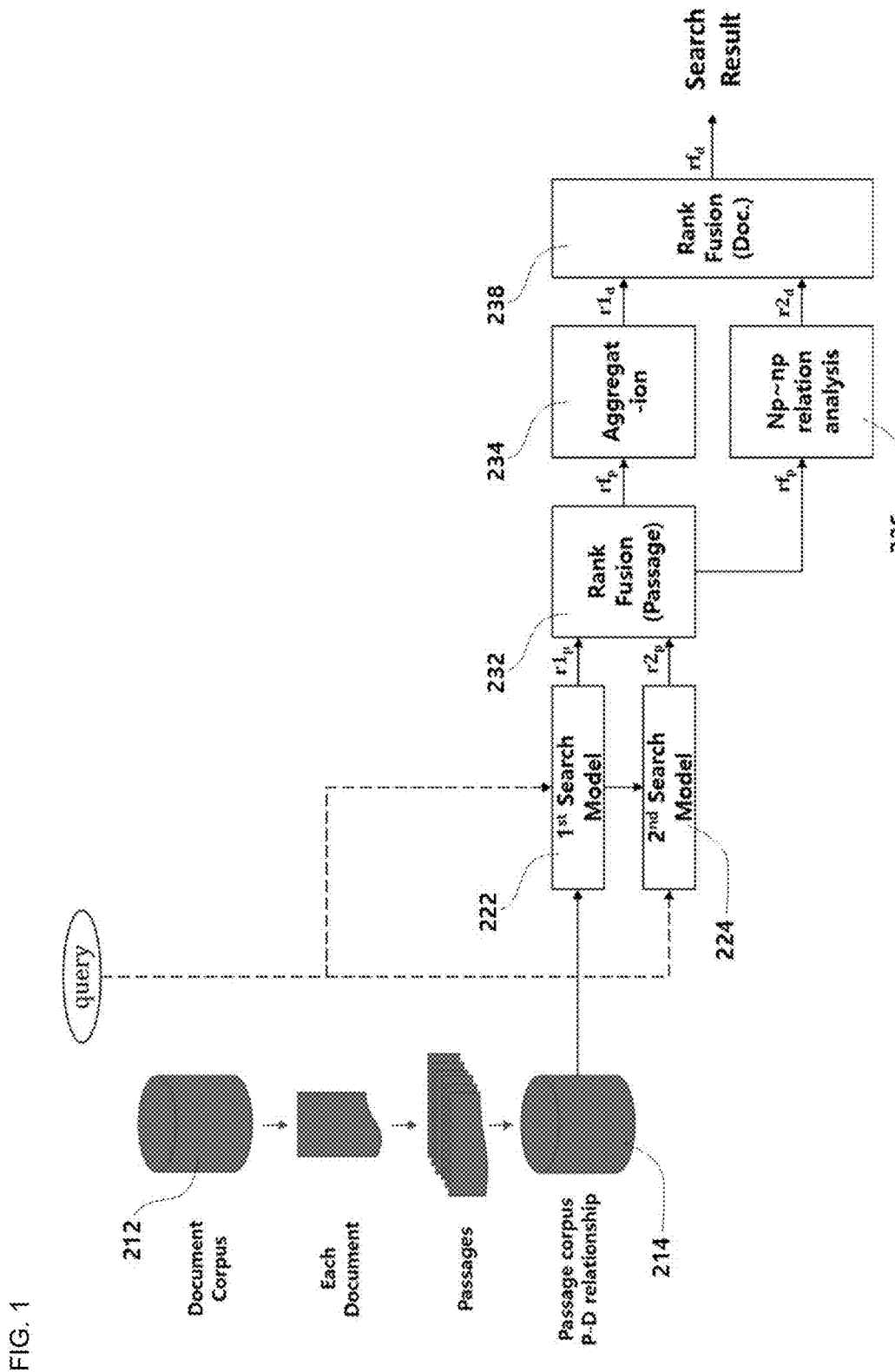
FIG. 1 is a configuration diagram conceptually illustrating a method for providing search results based on passage-level search according to an embodiment of the present invention.

Hereinafter, exemplary embodiments of the present invention will be described in detail with reference to the accompanying drawings. Prior to the description of the present invention, it will be noted that the terms and wordings used in the specification and the claims should not be construed as general and lexical meanings, but should be construed as the meanings and concepts that agree with the technical spirits of the present invention, based on the principle that the concepts of the terms may be properly defined by the inventor(s) to describe the invention. Since the examples described in the specification and the configurations illustrated in the drawings are merely preferred embodiments of the present invention and cannot represent all the technical sprints of the present invention, it should be understood that various equivalents and modifications that may replace them can be present.

Terms containing ordinal numbers, such as first, second, etc., may be used to describe various components, but these terms are used only for the purpose of distinguishing one component from another and the corresponding components are defined by these terms. is not limited by Singular expressions include plural expressions unless the context clearly dictates otherwise.

Terms such as "comprise," "comprise," or "have" used in the specification should be understood to limit the presence of features, steps, components, or combinations thereof described in the specification, and one or more other This is not to exclude the possibility that features, steps, components, or combinations thereof may exist or be added.

Figure 2:
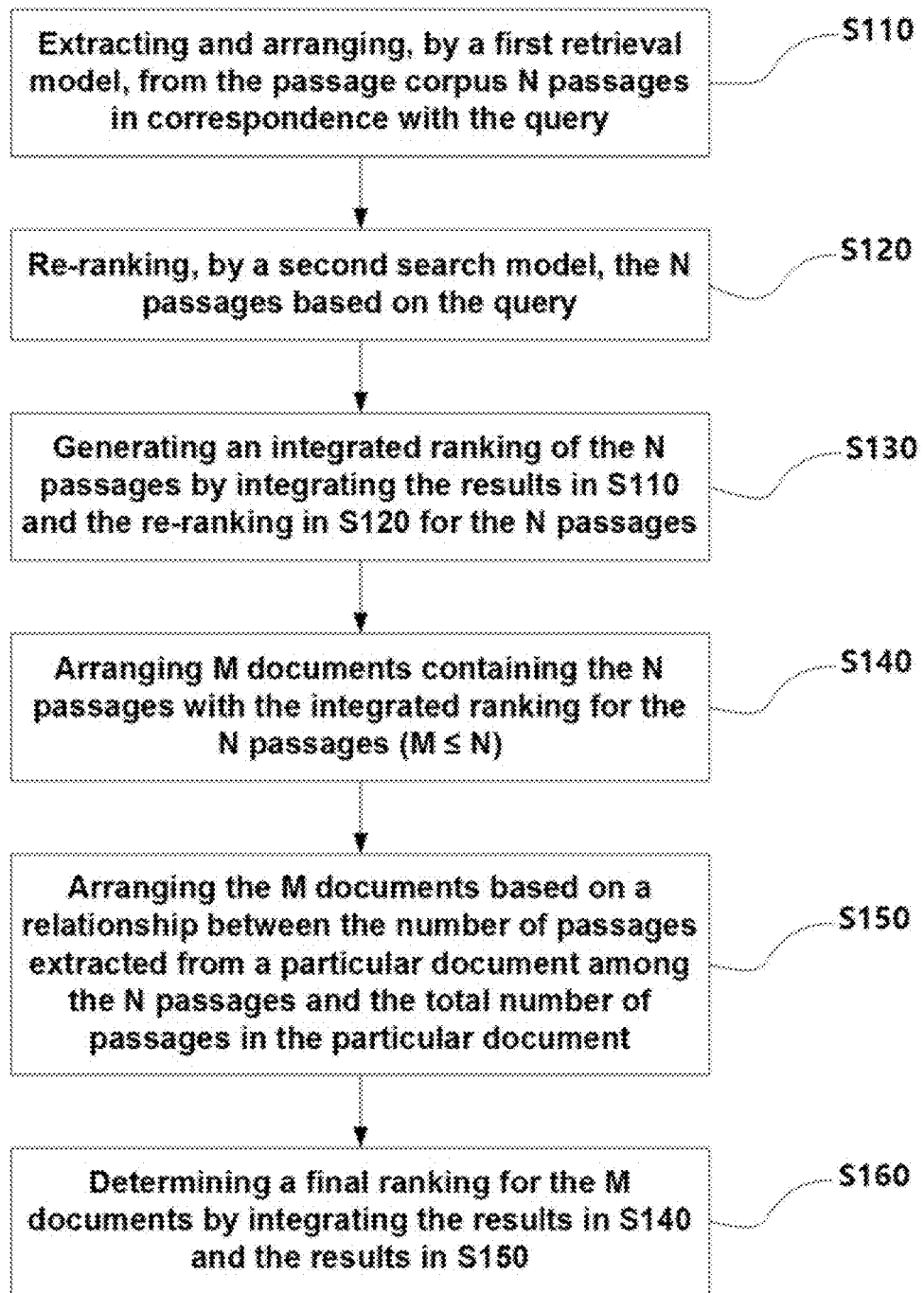
FIG. 2 is a flowchart of a method for providing search results based on passage-level search according to the embodiment of the present invention shown in FIG. 1.
Figure 3:
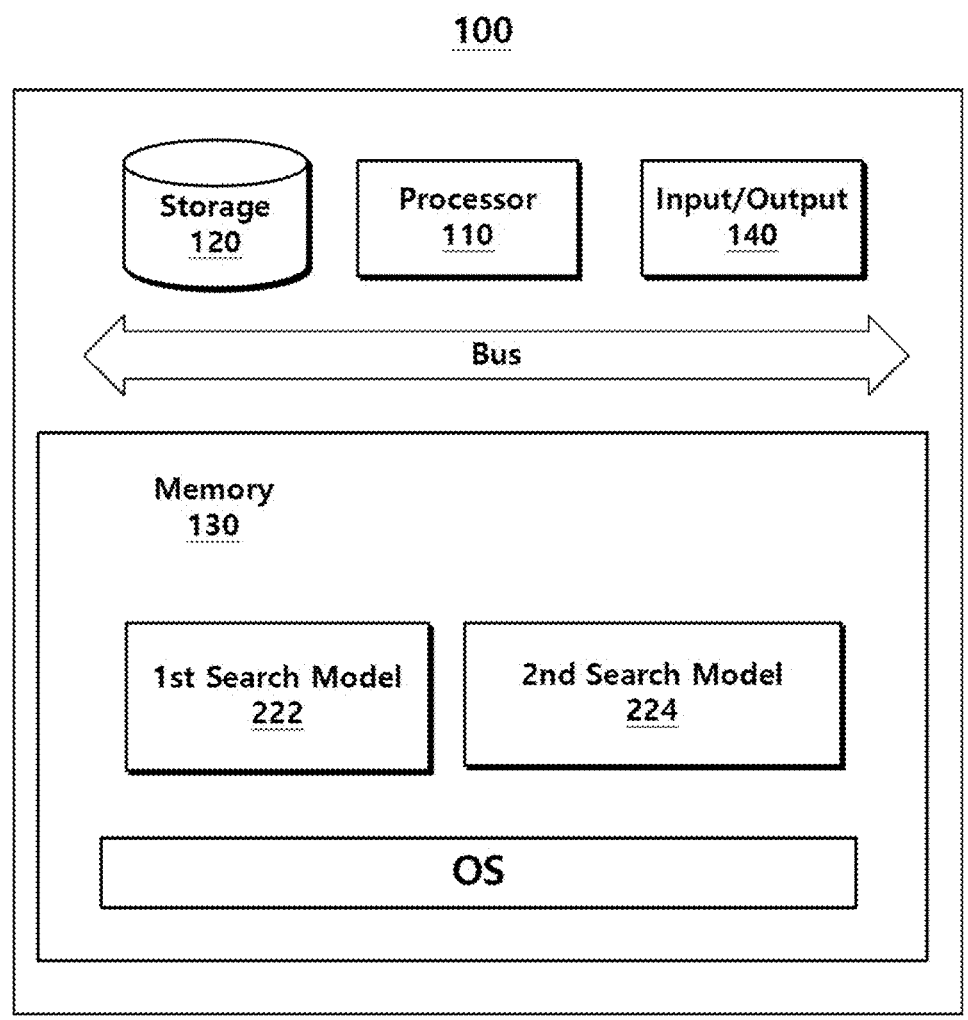
FIG. 3 schematically shows an apparatus for carrying out the method shown in FIG. 2.

FIGS. 1 to 3 show drawings according to one embodiment of the present invention. This embodiment is directed to a method of integrating search results using two or more passage-level search models. In the illustrated embodiment, two search models are shown, but three or more search models may be utilized.

The search system 100 includes a document corpus 112 in which documents are stored, and a passage corpus 114 in which each document in the document corpus is divided into a plurality of smaller units and stored. Although not shown in the drawing, information about document-passage relationships, number of passages included in each document, etc. is also stored.

The first search model 122 extracts and sorts N passages from the corpus based on a query entered by the user. The second search model 124 rearranges the N passages extracted by the first search model 122 based on the query entered by the user. Although the second search model 124 may extract and sort passages from the corpus independently of the first search model 122, the method described above is adopted in this embodiment. This method has recently been widely used to solve the problem that artificial intelligence based search models have high precision but slow processing speed. In other words, passages are first extracted from the corpus using the first search model 122, which has a fast processing speed, and a second search based on artificial intelligence is performed with a slow processing speed but relatively higher precision than the first search model 122.

This is a method that compromises processing speed and precision by using the model 124 to re-rank the passages extracted by the first search model 122. In this case, it is desirable that the first search model 122 has a high recall rate. As the first search model 122, a search model based on statistical techniques, for example, BM25, is mainly used, but recently, search models that utilize artificial intelligence techniques but have a higher recall and faster processing speed than the second search model 124 have been proposed. In summary, in a configuration such as this embodiment, it is preferable to use the first search model 122 with a relatively high recall rate and fast processing speed compared to the second search model 124, and the second search model 124 has relatively high precision and processing speed may be slower than that of the first search model 122.

The ranking result (r1p) by the first search model 122 for N passages and the re-ranking result (r2p) by the second search model 124 are rank-fused to provide an integrated ranking result (rfp). Rank fusion is a technique that provides single search result by integrating search results from different search models, and various integration methods have been proposed. As a representative method, there is reciprocal rank fusion (RRF). Rank fusion is known to improve the precision of search results in general, rather than simply integrating search results.

The ranking result (rfp) for the N passages integrated in the rank fusion 132 is converted into the ranking (r1d, r2d) of the document corresponding to the passage through aggregation 134 and Np~np relation analysis 136.

Aggregation refers to handling cases where there are two or more passages included in one document among N passages. All N passages extracted by the first search model may be included in different documents, or some passages may be included in the same document. Therefore, if the number of documents corresponding to N passages is M, a relationship of N≥M is established. Therefore, if there are two or more passages extracted from the same document among the N passages extracted by the first search model, the problem is how to determine the rank of the passage as the rank of the document. Various methods have been proposed in this regard, for example, determining the rank of the passage with the highest similarity as the rank of the corresponding document, summing the similarity of all passages included in the document, determining the similarity of the first passage of the document as the similarity of the document, and so on. There is no guarantee that all passages included in a specific document are included in the N passages extracted by the first search model 122, and there is no guarantee that the first passage of the document is extracted. Therefore, when there are two or more passages extracted from the document, the second and third methods are difficult to adopt, and the rank of the passage with the e highest similarity among these passages is determined as the rank (r1d) of the corresponding document. However, it is not necessarily limited to such method. For example, if there are multiple passages extracted from the same document among N passages, their similarities may be appropriately added to determine the similarity of the corresponding document. For example, Kong et al., "Kong, K., et al. "Passage-based retrieval using parameterized fuzzy set operators." ACM SIGIR Workshop on Mathematical/Formal. Methods for Information Retrieval. 2004." Three methods have been proposed: Disjunctive Relevance Decision (DRD), Aggregate Relevance (AR), and Conjunctive Relevance Decision (CRD). For example, Kong et al. proposed three methods in their paper of "Passage-based retrieval using parameterized fuzzy set operators." ACM SIGIR Workshop on Mathematical/Formal. Methods for Information Retrieval. 2004: Disjunctive Relevance Decision (DRD), Aggregate Relevance (AR), and Conjunctive Relevance Decision (CRD).

Figure 7:
FIG. 7 explains the problems of the passage-level search method.

The Np~np relation analysis 136 means analyzing the relationship between the total number of passages Np of a particular document and the number of passages np included in the N passages extracted by the first search model among the passages of the document to determine the ranking (r2d) of the documents corresponding to the N passages. For example, if the number of documents corresponding to N passages is M, these M documents may be sorted in order from the document with the smallest value given by the relational expression (Np−np)/Np to the document with the largest value. It can be. Conversely, the documents may be sorted from the largest value to the smallest value given by the relation np/Np. Considering the cases shown in FIGS. 7(*a*) to 7(*c*), for the document ranked first (D1), the total number of passages (Np) is 168 and the number of passages (np) to be extracted by the first search model is 2, so (Np−np)/Np=(168−2)/168=0.9881 and np/Np=2/168=0.0119. For the document ranked second (D2), the total number of passages (Np) is 124 and the number of passages (np) to be extracted is 61, so (Np−np)/Np=(124−61)/124=0.5081 and np/Np=61/124=0.4919. Therefore, if the two documents are ranked in the first way, D2 will be ranked higher than D1, and if they are ranked in the second way, D2 will still be ranked higher than D1.

The document ranking (r1d) determined by aggregation 134 and the document ranking (r2d) determined by Np–np relation analysis 136 are integrated by rank fusion 138. The same technique as the rank fusion for passages (132) can be used, or a different technique can be used. In the case shown in FIGS. 7(*a*) to 7(*c*), when the document rankings by the Np~np relation analysis 136 are integrated, the rankings between D1 and D2 may change.

The ranking (rfd) of the documents integrated by rank fusion 138 is provided to the user as the final search result.

The method according to the above-mentioned embodiment is described with reference to FIG. 2 as follows: First, by the first search model 122, N passages corresponding to the input query are extracted from the corpus 114 and ranked (S110). Next, the N passages extracted by the first search model 122 are re-ranked based on the input query by the second search model 124 (S120). In general, the results of the ranking by the two models are different. An integrated ranking (rfp) for the N passages is generated (S130) by integrating 132 the ranking results (r1p) from step S110 and the re-ranking results (r2p) from step S120. The integration of the ranking and re-ranking results may be accomplished using Reciprocal Rank Fusion (RRF) method. M documents corresponding to N passages (where M is less than or equal to N) are arranged 134 into ranks corresponding to the integrated ranking for N passages (S140), and said M documents are sorted (136) based on a relationship between the number of passages extracted from the same document among the N passages and the total number of passages in that document (S150). By integrating the ranking result (r1d) in step S140 and the ranking result (r2d) in step S150 for the M documents, the integrated ranking (rfd) for the M documents is determined, and accordingly, a final search result is provided to the user.

FIG. 3 shows a computer device for performing the search method according to the above-mentioned embodiment. Since the method according to the embodiment has been described in detail with reference to FIGS. 1 and 2, a computer device 300 for performing the method will be schematically described with reference to FIG. 3.

Referring to FIG. 3, the computer device 300 includes a processor 310, a non-volatile storage unit 32 for storing programs and data, a volatile memory unit 330 for storing programs in execution, an input/output unit(s) 340 for inputting and outputting information to and from a user, and a bus which is an internal communication pathway between these units. Running programs may include an operating system and various applications. Although not shown, the computer device includes a power supply unit.

The first search model 222 and the second search model 224 stored in the storage unit 320 are executed in the memory unit 330. The corpus 114 is stored in the storage unit 320, and a search method is performed based on a query input through the input/output unit 340. The storage unit 320 additionally stores information about document-passage relationship, the number of passages included in each document, etc. The document-passage relationship is used in step S140 for aggregation (134), and the number of passages included in each document is used in step S150 for Np~np relation analysis 136.

Figure 4:
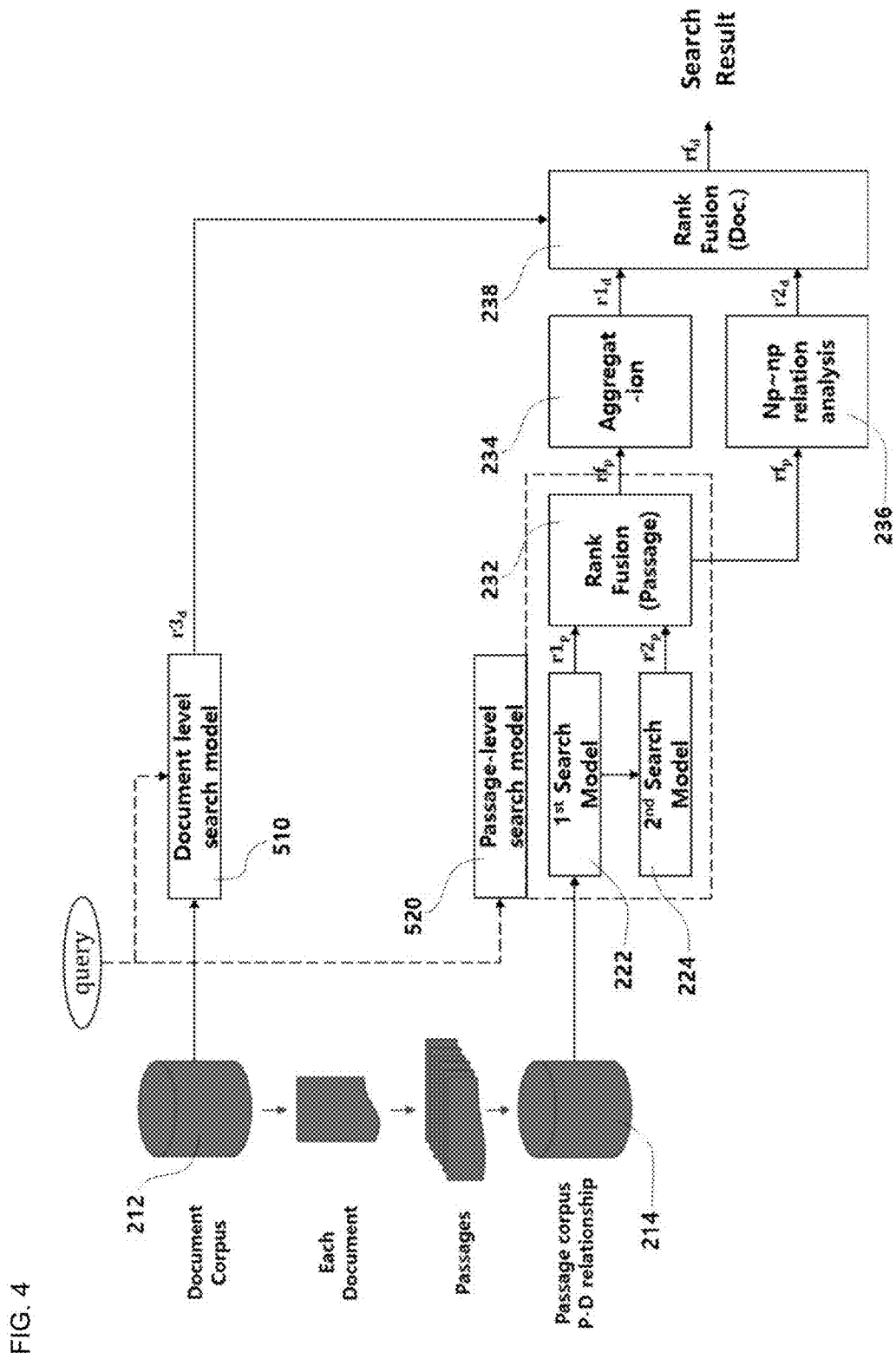
FIG. 4 is a configuration diagram to conceptually illustrate a method for providing search results according to another embodiment of the present invention, wherein rankings are determined by integrating passage-level search and document-level search.
Figure 5:
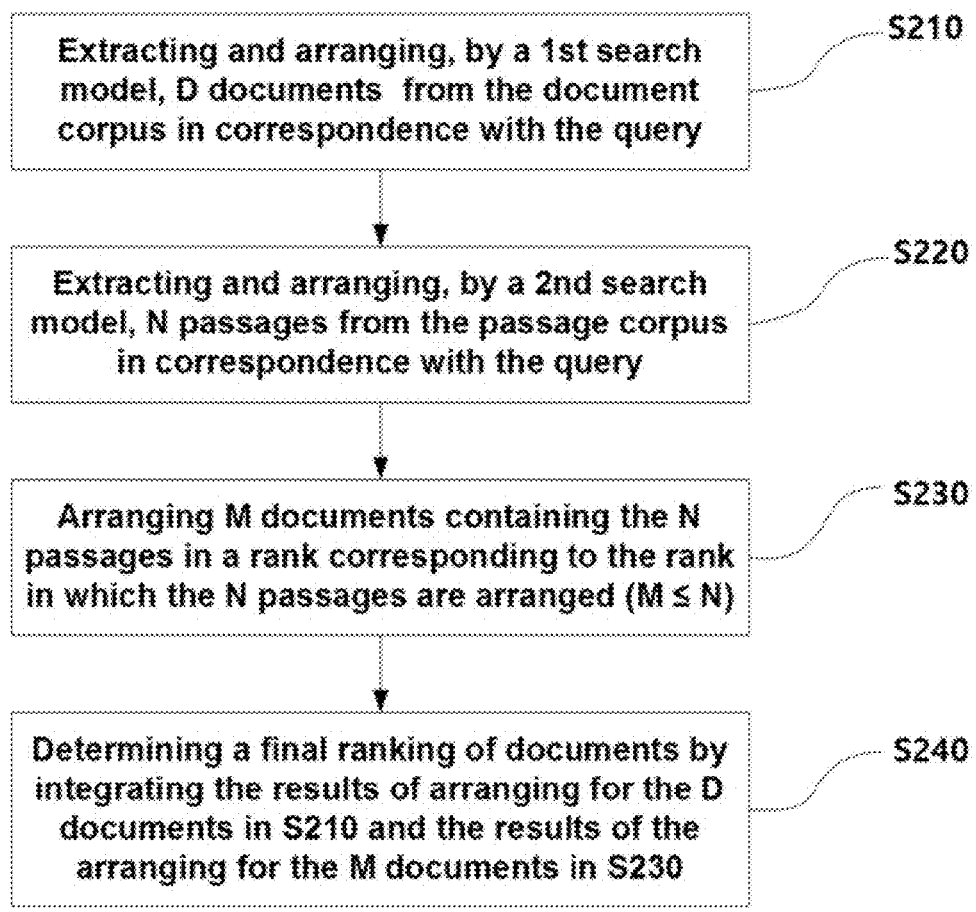
FIG. 5 is a flowchart of a method for providing search results by integrating passage-level search and document-level search according to the embodiment of the present invention shown in FIG. 4.
Figure 6:
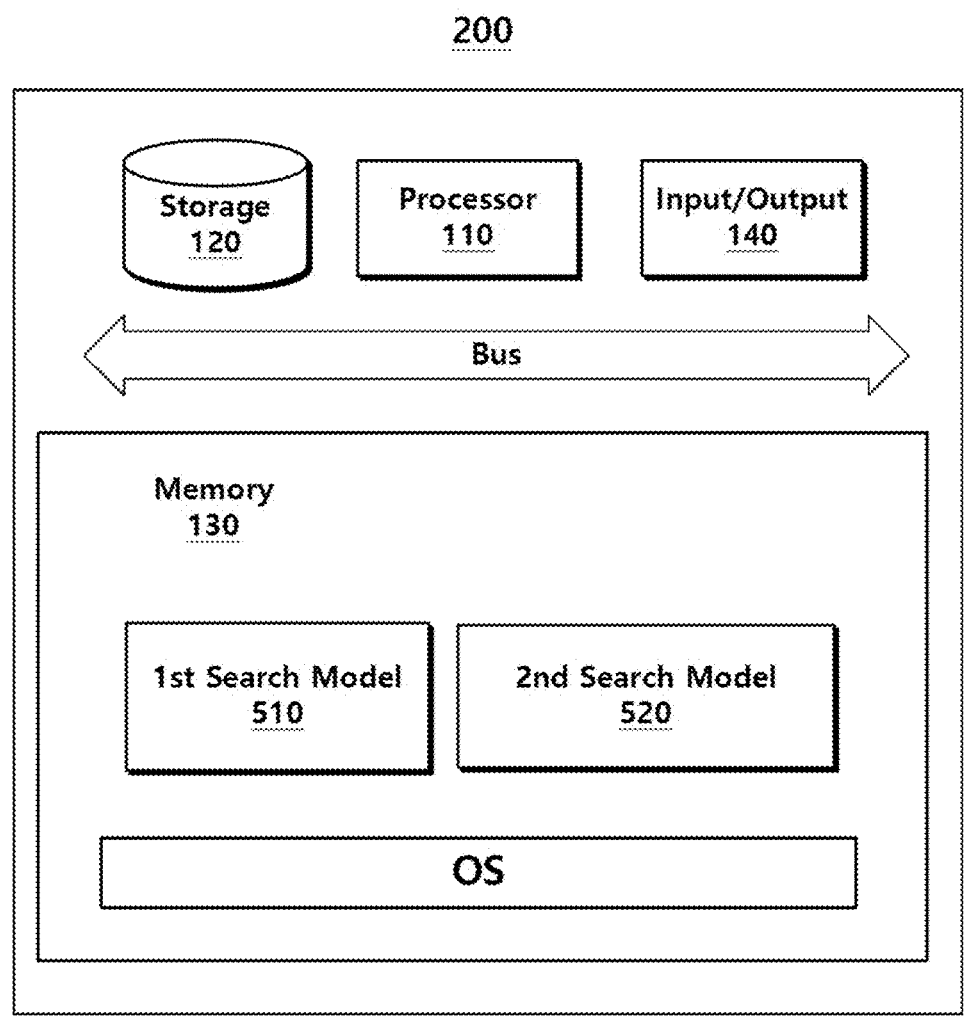
FIG. 6 schematically shows an apparatus for carrying out the method shown in FIG. 5.

FIGS. 4 to 6 show another embodiment of the present invention. While the aforementioned embodiment describe a method for integrating search results from two or more passage-based search models to provide search results of corresponding documents, this embodiment describes a method for integrating passage-based search results and document-based search results to determine a ranking.

The search system 400 includes a document corpus 112 in which documents are stored, and a passage corpus 114 in which each document in the document corpus is divided into a plurality of smaller units and stored. Although not shown, information about document-passage relationship, number of passages included in each document, etc. is additionally stored.

By the document-level search model 410, D documents corresponding to the query entered by the user are extracted from the document corpus 112 and sorted. As the document-level search model 410, a model that can perform a search on the entire document is used. For example, BM25 can be used as a statistical technique. Recently, methods have been proposed to improve performance by replacing the TF-IDF based indexing file of BM25 with another indexing file generated using artificial intelligence techniques.

By the passage-level search model 420, N passages corresponding to the query entered by the user are extracted from the passage corpus 114 and ranked. The passage-level search model 420 may consist of one search model, or, as in the above-described embodiment, two or more search models may be used. Since the case of using two or more search models has been described in detail in the above-described embodiment, only the case of using one search model will be described in this embodiment. After N passages are extracted and ranked by the passage-level search model 420, M documents containing N passages (where M is less than or equal to N) are arranged by the aggregator 134 into a rank corresponding to the rank in which the N passages are arranged. Additionally, the M documents are arranged based on the relationship between the number of passages extracted from the same document among the N passages and the total number of passages in the document 136.

The ranking result (r3d) by the document-level search model (410), the ranking result (r1d) by the aggregation related to the passage-level search model (134), and the ranking result (r2d) by the Np~np relation analysis (136) are combined by rank fusion (138) to provide the final search result. The rank fusion technique utilizes the fact that rank fusion is possible even if the search results of either search model do not exist. Accordingly, even if D, the number of documents extracted and arranged by the document-level search model 410, and M, the number of documents corresponding to the N passages extracted by the passage-level search model 420, are not the same, the rank fusion is possible. possible. For example, Reciprocal Rank Fusion (RRF) method may be utilized.

Referring to FIG. 5, the method according to the present embodiment will be described as follows: First, by a document-level search model 410, D documents corresponding to a query entered by a user are extracted from the document corpus 112 and arranged (S210), and by a passage-level search model 420, N passages corresponding to the query entered are extracted from the corpus 114 and arranged (S220). M documents containing N passages (M is less than or equal to N) are sorted (S230) in a rank corresponding to the rank in which the N passages are arranged, and M documents are arranged (S240) based on a relationship between the number of passages extracted from the same document among the N passages and the total number of passages in that document. Finally, a ranking of documents to be provided as search results is determined by integrating the ranking results of the above D documents in step S210 and the ranking results of step S230 and step S240 for the M documents.

FIG. 6 shows a computer device for performing a search method according to the present embodiment. Since the method according to this embodiment has been described in detail with reference to FIGS. 4 and 5, a computer device 300 for performing the method will be schematically described with reference to FIG. 6.

Referring to FIG. 6, the computer device 300 includes a processor 310, a non-volatile storage unit 320 for storing programs and data, a volatile memory unit 330 for storing programs in execution, an input/output unit(s) 340 for inputting and outputting information to and from a user, and a bus which is an internal communication pathway between these units. Running programs may include an operating system and various applications. Although not shown, the computer device includes a power supply unit.

The document-level search model 410 and the passage-level search model 420 stored in the storage unit 320 are executed in the memory unit 330. The document corpus 112 and the passage corpus 114 are stored in the storage unit 320, and a search method is performed based on the query input through the input/output unit 340. The storage unit 320 additionally stores information about document-passage relationship, the number of passages included in each document, etc. The document-passage relationship is used in step S230 for aggregation 134, and the number of passages included in each document is used in step S240 for Np to np relation analysis 136.

The embodiment according to the present invention shown in FIGS. 4 to 6 can be used when combining a new artificial intelligence-based passage-level search system with an existing document-level search system.

The foregoing detailed description should not be construed as limiting in any respect and should be considered illustrative. The scope of the present invention should be determined by reasonable interpretation of the appended claims, and all changes within the equivalent scope of the present invention are included in the scope of the present invention.

What is claimed is:

1. A computer-implemented method for providing a user with search results corresponding to a query entered by the user based on a document corpus including a plurality of documents to be searched and a passage corpus including a plurality of passages extracted from each document of the document corpus, the method comprising:
    (a) extracting and arranging, by a document-level search model, D documents from the document corpus corresponding to the query;
    (b) extracting and arranging, by a passage-level search model, a globally top-N set of passages across the passage corpus corresponding to the query, the globally top-N set being determined as top-N with respect to passage relevance to the query;

(c) arranging M documents containing the N passages in a rank corresponding to the rank in which the N passages are arranged, wherein M is less than or equal to N;

(d) arranging the M documents based on a relationship between the number of passages extracted from a single document among said N passages and the total number of passages in the single document; and (e) determining a final ranking of documents by integrating the results of arranging for the D documents in step (a) and the results of the arranging for the M documents in step (d), by performing rank fusion to integrate rankings, the rank fusion being configured to operate even when the result lists are non-overlapping and/or have different sizes (D≠M);

wherein, in step (d), the M documents are arranged either in an order from documents with a smaller value given by the relation (Np−np)/Np to documents with a larger value, or in an order from documents with a larger value given by the relation np/Np to documents with a smaller value, where np represents a number of passages extracted from a particular document among said N passages, and Np represents a total number of passages in the particular document.

2. The method of claim 1,

Wherein the passage-level search module of step (b) includes a first search model having a relatively high recall and a relatively fast processing speed and a second search model having a relatively high precision and a relatively slow processing speed, and wherein step (b) includes:

(b1) extracting and arranging, by the first search model, N passages from the passage corpus in correspondence with the query;

(b2) re-ranking, by the second search model, the N passages extracted in step (b1) based on query; and (b3) integrating the results from step (b1) and step (b2) for the N passages to generate a final ranking for the N passages.

3. The method of claim 2, wherein the integration in step (b3) is performed by Reciprocal Rank Fusion (RRF).

4. The method of claim 1, wherein the integration in step (d) is made by Reciprocal Rank Fusion (RRF).

5. An apparatus for providing a user with search results corresponding to a query entered by the user from a passage corpus comprising a plurality of passages extracted from each document of a document corpus, comprising:

at least one processor; and at least one memory for storing computer-executable instructions, wherein the computer-executable instructions stored in the at least one memory make the at least one processor to perform the following steps:

(a) extracting and arranging, by a document-level search model, D documents corresponding to the query from the document corpus;

(b) extracting and arranging, by a passage-level search model a globally top-N set of passages across the passage corpus corresponding to the query, the globally top-N set being determined as top-N with respect to passage relevance to the query;

(c) arranging M documents containing the N passages in a rank corresponding to the rank in which the N passages are arranged, wherein M is less than or equal to N;

(d) arranging the M documents based on a relationship between the number of passages extracted from a single document among said N passages and the total number of passages in the single document; and (e) determining a final ranking of documents by integrating the results of arranging for the D documents in step (a) and the results of the arranging for the M documents in step (d), by performing rank fusion to integrate rankings, the rank fusion being configured to operate even when the result lists are non-overlapping and/or have different sizes (D≠M);

wherein, in step (d), the M documents are arranged either in an order from documents with a smaller value given by the relation (Np−np)/Np to documents with a larger value, or in an order from documents with a larger value given by the relation np/Np to documents with a smaller value, where np represents a number of passages extracted from a particular document among said N passages, and Np represents a total number of passages in the particular document.

6. The apparatus of claim 5, wherein the passage-level search model includes a first search model having a relatively high recall and a relatively fast processing speed and a second search model having a relatively high precision and a relatively slow processing speed.

7. The apparatus of claim 6, wherein at least one of the first search model and the second search model is an artificial intelligence based search model.

8. The apparatus of claim 5, wherein at least part of the documents in the document corpus has titles, and wherein each passage of the passage corpus includes the title of a document of which said each passage is a part.

* * * * *